(12) United States Patent
Sime (10) Patent No.: US 8,190,341 B2
(45) Date of Patent: May 29, 2012

(54) METHOD OF OPERATING A TRANSMISSION AUXILIARY PUMP

(75) Inventor: Karl Andrew Sime, Mason, MI (US)

(73) Assignee: GM Global Technology Operations LLC, Detroit, MI (US)

(*) Notice: Subject to any disclaimer, the term of this patent is extended or adjusted under 35 U.S.C. 154(b) by 1162 days.

(21) Appl. No.: 12/019,098

(22) Filed: Jan. 24, 2008

(65) Prior Publication Data
US 2009/0192685 A1 Jul. 30, 2009

(51) Int. Cl.
G06F 7/00 (2006.01)
G05D 1/00 (2006.01)

(52) U.S. Cl. .......... 701/60; 701/1; 701/36; 701/51; 701/52; 701/53

(58) Field of Classification Search .......... None
See application file for complete search history.

(56) References Cited

U.S. PATENT DOCUMENTS 6,176,808 B1 * 1/2001 Brown et al. .......... 477/5
6,730,000 B1 * 5/2004 Leising et al. .......... 477/110
6,805,647 B2 * 10/2004 Silveri et al. .......... 475/4
6,973,781 B2 * 12/2005 Brown et al. .......... 60/413
7,036,892 B2 5/2006 Suzuki et al.
7,232,402 B2 * 6/2007 Tryon et al. .......... 477/5
7,243,011 B2 * 7/2007 Koenig et al. .......... 701/22

* cited by examiner

Primary Examiner — Khoi Tran
Assistant Examiner — Ian Jen
(74) Attorney, Agent, or Firm — Quinn Law Group, PLLC (57) ABSTRACT

A method of controlling an auxiliary pump for use with a transmission in a vehicle is provided, the vehicle having a system voltage/current. The method comprises: determining an optimal auxiliary pump start voltage/current; determining if the system voltage/current is less than the optimal auxiliary pump start voltage/current; if yes, determining if the auxiliary pump is in a start-mode and if a predetermined override condition has been met; determining if the actual auxiliary pump speed is less than a desired auxiliary pump speed if the auxiliary pump is in the start-mode; if not, determining if the auxiliary pump is in an on-state; and, increasing an actual auxiliary pump voltage/current to equal the optimal auxiliary pump start voltage/current if the actual auxiliary pump speed is less than the desired auxiliary pump speed or the predetermined override condition has been met.

20 Claims, 4 Drawing Sheets

METHOD OF OPERATING A TRANSMISSION AUXILIARY PUMP

TECHNICAL FIELD

The present invention relates generally to motorized vehicle powertrains, and more specifically to methods of operating an auxiliary pump for a power transmission.

BACKGROUND OF THE INVENTION

Almost all modern day automobiles include a powertrain that is comprised of an engine and/or motor in power flow communication with a final drive (e.g., differential and wheels) via a multi-speed power transmission. The multi-speed power transmission requires a supply of pressurized fluid to properly operate. The pressurized fluid may be used for such functions as cooling, lubrication, and torque converter operation. It is well known that the lubricating and cooling capabilities of transmission oil systems greatly impact the reliability and durability of the transmission. Additionally, multi-speed transmissions require the hydraulic system to provide controlled engagement and disengagement, on a desired schedule, of the various torque transmitting mechanisms that operate to establish the speed ratios within the internal gear arrangement.

One premise behind hybrid-type vehicles is that alternative power is available to propel the vehicle, minimizing reliance on the engine for power, thereby increasing fuel economy. Since hybrid-type vehicles can derive their power from sources other than the engine, engines in hybrid-type vehicles typically operate at lower speeds more often than their traditional counterpart, and can be turned off while the vehicle is propelled by the alternative power source(s). To this regard, when the engine in a hybrid-type vehicle is not operating (i.e., in a power-off state), hydraulic pumps which derive their power solely from the engine may become inoperable. As such, many hybrid powertrains include an electrically-driven secondary or auxiliary pump that runs independent of the engine—e.g., powered by the vehicle drive lines or the battery, to provide hydraulic pressure during periods when the engine is shutdown.

For fuel economy reasons, vehicle system voltage is typically set as low as possible, an undesirable situation for some transmission auxiliary pumps. Permanently setting the vehicle system to a higher voltage—for example, not tying the voltage increase directly to a hybrid engine-off mode transition, is also undesirable for reasons of fuel economy, because the higher voltage would increase overall vehicle power consumption. However, a transmission auxiliary pump which fails during transition to hybrid "engine-off driving mode" can potentially result in slip in the transmission launching clutch, and may trigger a "limp-home code" in production.

Packing space in and around the powertrain in hybrid-type vehicles is often scarce, often restricting use of a larger auxiliary pump motor. In addition to architectural limitations, installing a larger pump motor is not always possible due to mass, cost, and fuel economy constraints. As such, the motor of a transmission auxiliary pump may be so small that it may not be able to start reliably under certain conditions.

SUMMARY OF THE INVENTION

In order to enhance the efficiency, reliability, and response time of a vehicle powertrain, the present invention provides an improved method of operating a transmission auxiliary pump by utilizing a novel pump voltage/current boost strategy. The present methodology provides a hybrid powertrain system developed to boost vehicle system voltage or current during hybrid transmission auxiliary pump start-up and during significant pressure and speed step change requests, such as transition to "engine-off" driving mode. Accordingly, a smaller auxiliary pump motor can be used, reducing cost, mass, and packaging space, while boasting a more reliable pump startup.

According to one embodiment of the present invention, a method of controlling an auxiliary pump for use with a power transmission in a vehicle is provided. The vehicle includes an electronic control unit (ECU) and a throttle, and has a system voltage and/or a system current, which may be referred to collectively as a system power characteristic. The method includes the steps of: determining an optimal auxiliary pump start voltage and/or start current (which may be referred to collectively as an optimal auxiliary pump start characteristic); determining if the system power characteristic is less than the optimal auxiliary pump start characteristic; if yes, then determining if the auxiliary pump is in a start-mode; if the auxiliary pump is in start-mode, then determining if the actual auxiliary pump speed is less than a desired auxiliary pump speed; and, if the actual auxiliary pump speed is less than the desired auxiliary pump speed, increasing the actual auxiliary pump voltage or current to equal the optimal auxiliary pump start characteristic—i.e., the optimal auxiliary pump start voltage or current. Preferably, the method also includes: determining if a predetermined override condition has been met if the system power characteristic is less than the optimal auxiliary pump start characteristic; and, if the predetermined override condition has been met, increasing the actual auxiliary pump voltage/current to equal the optimal auxiliary pump start voltage/current.

Increasing the actual auxiliary pump voltage/current preferably consists of commanding the ECU to override the system and boost or increase the system voltage/current to equal the optimal auxiliary pump start voltage/current. In a similar respect, determining if the auxiliary pump is in start-mode includes: determining if the actual auxiliary pump speed is greater than zero; determining if the ECU is delivering a prime auxiliary pump signal; and, determining if the auxiliary pump has exited the start mode.

The time during which the actual auxiliary pump voltage/current is increased to equal the optimal auxiliary pump start voltage/current is continuously monitored. Accordingly, the method includes determining when this time is greater than a precalibrated threshold time and, when the time exceeds the precalibrated threshold time, responding by setting the actual auxiliary pump voltage/current so that it is equal to a predetermined default level—e.g., decreases the actual auxiliary pump voltage/current so that it does not equal the optimal auxiliary pump start voltage/current, or increases the actual auxiliary pump voltage/current to equal a precalculated system voltage for charging system battery. If the monitored time has not exceeded the precalibrated threshold time, the method then determines if both the predetermined override condition is no longer met and the actual auxiliary pump speed is no longer less than the desired auxiliary pump speed. If so, the method responds by setting the actual auxiliary pump voltage/current so that it is equal to the predetermined default level According to one aspect of the invention, the method also includes determining if the auxiliary pump is in an on-state if it is determined the auxiliary pump is not in start-mode. If the auxiliary pump is in an on-state, the method responds by determining a hierarchy of optimization parameters, which preferably includes, but is not limited to, a startability parameter, a fuel economy parameter, a noise parameter, a temperature parameter, and a durability parameter. Determining the hierarchy of optimization parameters includes monitoring one or more of the following, but is limited to: a vehicle speed, a transmission oil temperature, a transmission input speed, a throttle position, a desired vs. actual auxiliary pump speed, a next-intended auxiliary pump speed, a ramp trajectory, or any combination thereof.

As part of this particular aspect of the invention, the method also includes: determining an optimal auxiliary pump steady-transient state voltage and/or current (which may be referred to collectively as an optimal auxiliary pump transition characteristic) based at least in part upon the hierarchy of optimization parameters; determining if the system power characteristic is not equal to the optimal auxiliary pump transition characteristic; if the system power characteristic is not equal to the optimal auxiliary pump transition characteristic, the method then determines if the auxiliary pump is in a steady state; and, if the auxiliary pump is in steady state, responding by increasing the actual auxiliary pump voltage/current to equal the optimal auxiliary pump transition characteristic—i.e., the optimal auxiliary pump steady-transient state voltage/current.

If the auxiliary pump is not in steady state, the method determines if the auxiliary pump is in a transient state. If so, the method responds by determining an optimal auxiliary pump transition characteristic (i.e., voltage or current) ramp rate based upon a predetermined magnitude of the transient state, and increasing the actual auxiliary pump voltage/current to equal the optimal auxiliary pump transition characteristic according to the optimal auxiliary pump transition characteristic ramp rate. Increasing the actual auxiliary pump voltage/current to equal the optimal auxiliary pump transition characteristic may include commanding the ECU to increase or boost the system voltage/current to equal the optimal auxiliary pump transition characteristic.

The time during which the actual auxiliary pump voltage/current is increased to equal the optimal auxiliary pump steady-transient state voltage/current is thereafter continuously monitored. Accordingly, the method includes determining when this time is greater than a precalibrated threshold time and, when the time exceeds the precalibrated threshold time, responding by setting the actual auxiliary pump voltage/current to equal a default power level—e.g., decreases the actual auxiliary pump voltage/current so that it does not equal the optimal auxiliary pump start voltage/current, or increases the actual auxiliary pump voltage/current to equal a precalculated system voltage for charging system battery. If the time during which the actual auxiliary pump voltage/current is increased to equal the optimal auxiliary pump steady-transient state voltage/current does not exceed the precalibrated threshold time, the method then determines if the auxiliary pump is no longer in an on-state. If so, the method responds by setting the actual auxiliary pump voltage/current to equal the default power level noted above.

The above features and advantages, and other features and advantages of the present invention will be readily apparent from the following detailed description of the preferred embodiments and best modes for carrying out the present invention when taken in connection with the accompanying drawings and appended claims.

DESCRIPTION OF THE PREFERRED EMBODIMENT

The present invention is described herein in the context of a hybrid-type powertrain having a power transmission. The hybrid powertrain shown in FIG. 1 has been greatly simplified, it being understood that further information regarding the standard operation of a hybrid power transmission (or a hybrid-type vehicle for that matter) may be found in the prior art. Furthermore, it should be readily understood that FIG. 1 merely offers a representative application by which the present invention may be incorporated and practiced. As such, the present invention is not limited to the particular powertrain or transmission configuration illustrated in FIG. 1.

Figure 1:
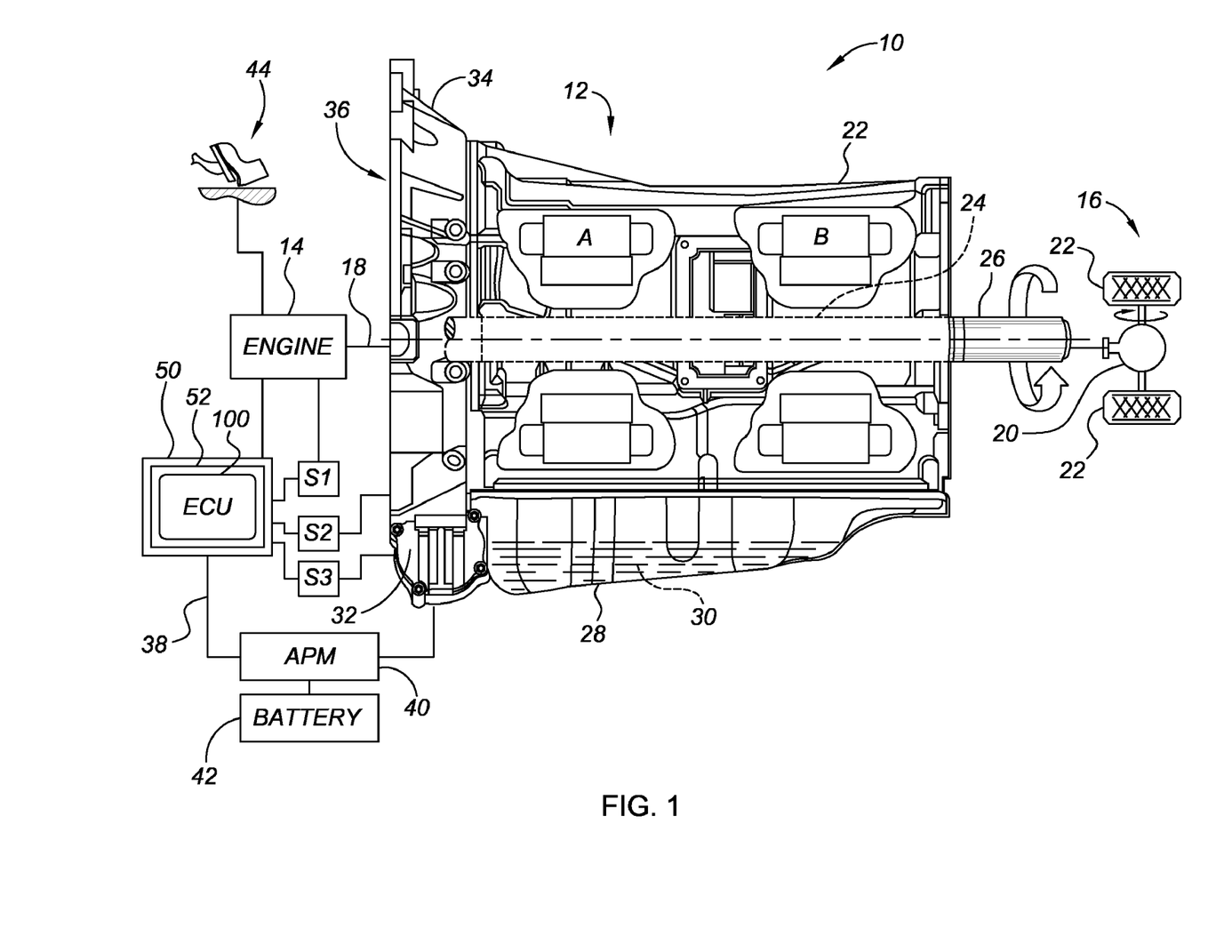
FIG. 1 is a schematic diagram of an exemplary powertrain system for use of the present invention.

Referring to the drawings, wherein like reference numbers refer to like components throughout the several views, there is shown in FIG. 1 a schematic depiction of an exemplary vehicle powertrain system, identified generally as 10, having a restartable engine 14 drivingly connected to, or in power flow communication with, a final drive system 16 via a hybrid-type power transmission 12. The engine 14 transfers power, preferably by way of torque, to the transmission 12 by an engine output shaft or crankshaft 18. The transmission 12 is adapted to manipulate and distribute power from the engine 14 to the final drive system 16, which is represented herein by a rear differential 20 and wheels 21. Specifically, the rear differential 20 is configured to distribute torque from a transmission output member 26 to drive the plurality of wheels 22 and propel the hybrid vehicle (not specifically identified herein). In the embodiment depicted in FIG. 1, the engine 14 may be any engine, such as, but not limited to, a 3-stroke diesel or a 4-stroke gasoline engine, which is readily adapted to provide its available power output typically at a number of revolutions per minute (RPM). Although not illustrated in FIG. 1, it should be appreciated that the final drive system 16 may comprise any known configuration—e.g., front wheel drive (FWD), rear wheel drive (RWD), four-wheel drive (4WD), or all-wheel drive (AWD).

FIG. 1 also displays selected components of the transmission 12, including a main housing 22 configured to encase first and second electric motor/generator assemblies A and B, respectively. The first and second motor/generators A, B are indirectly journaled onto a main shaft of the transmission 12, shown hidden at 24, preferably through a series of planetary gear sets. The motor/generators A, B operate with one or more selectively engageable torque transmitting mechanisms (e.g., clutches, brakes, etc.) to rotate the transmission output shaft 26. The main housing 22 covers the inner most components of the transmission 12, such as the motor/generators A, B, planetary gear arrangements, main shaft 24, and torque transmitting devices (all of which are mentioned for exemplary purposes and not all are shown).

An oil pan or sump volume 28 is located on the base of the main housing 22, and is configured to stow or store hydraulic fluid, such as transmission oil (shown hidden in FIG. 1 at 30)

for the transmission 12 and its various hydraulically-driven components. Additionally, an auxiliary (or secondary) transmission pump 32 is mounted to the base of the transmission input housing (or front cover) 34, and secured nestably adjacent the oil pan 28. The auxiliary oil pump 32 is in fluid communication (e.g., via hydraulic circuitry) with the transmission 12 to provide pressurized fluid to the transmission 12 during specific operating conditions, such as engine shutdown and vehicle shutdown. Finally, the engine 14 is selectively fluidly connectable to the transmission 12 through a conventional hydrodynamic torque converter assembly, identified generally as 36. As seen in FIG. 1, the hydrodynamic torque converter 36 is adapted to be operatively positioned between the engine 14 and transmission 12, housed in the input housing 34 portion of the transmission housing 22.

Figure 2A:
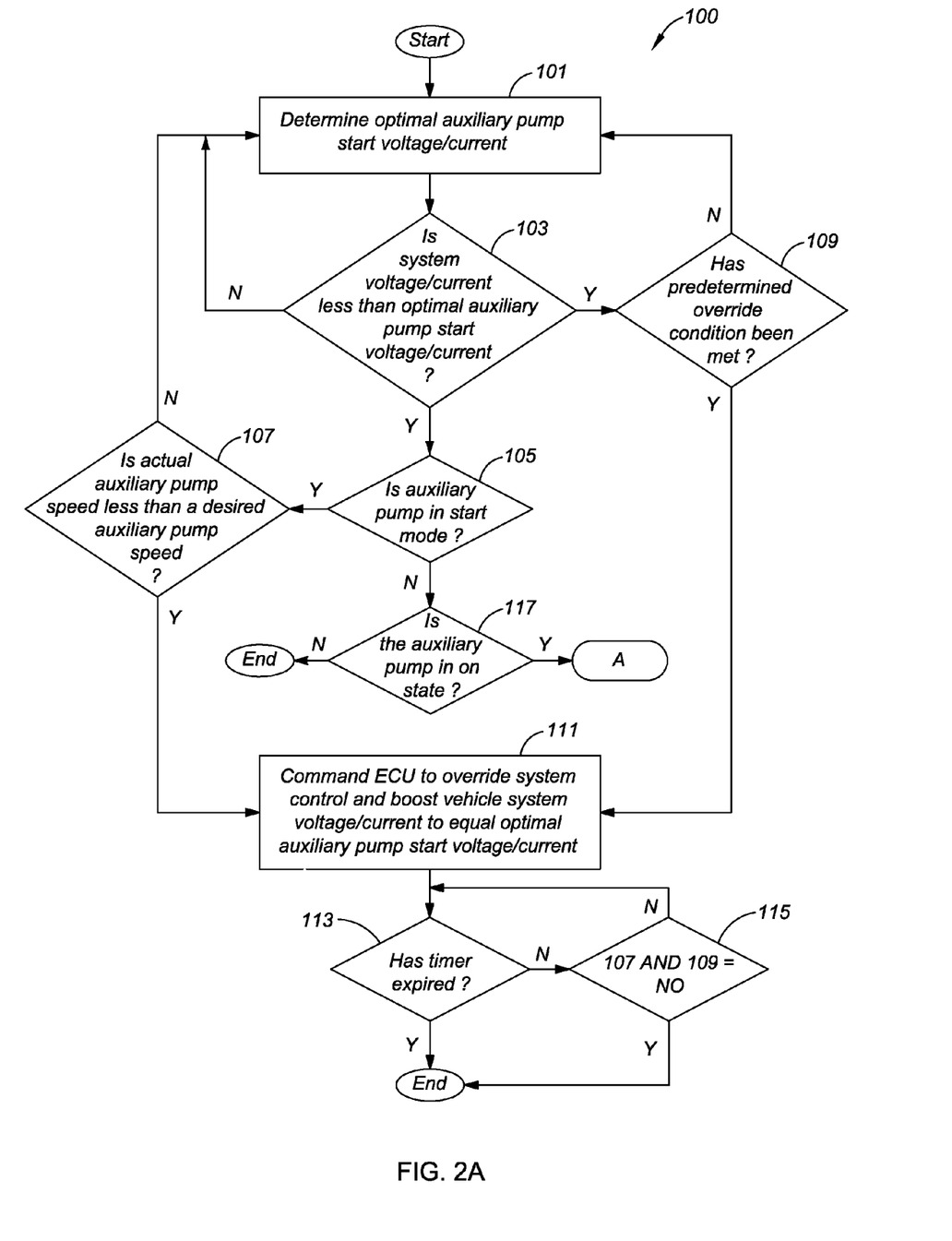
FIGS. 2A and 2B, in combination, provide a flow chart illustrating an algorithm or method of operating a transmission auxiliary pump in accordance with a preferred embodiment of the present invention.
Figure 2B:
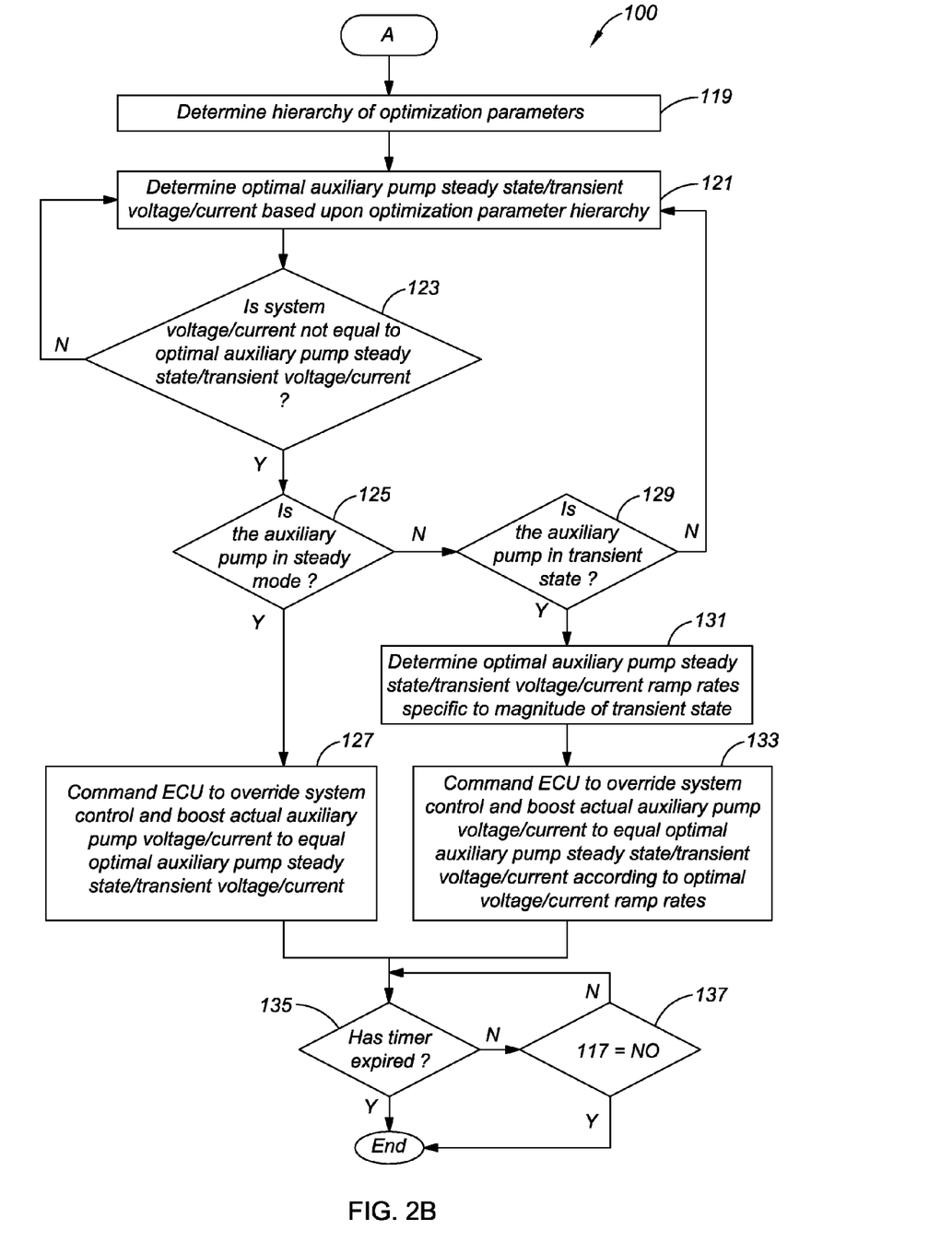

The powertrain 10 also includes a distributed control system, which includes, but is not limited to, an engine control module (ECM), a transmission control module (TCM), and an energy storage control module (ESCM), depicted collectively in FIG. 2 in an exemplary embodiment as a microprocessor based electronic control unit (ECU) 50. The ECU 50 has a suitable amount of programmable memory 52 that is programmed to include, among other things, an algorithm or method 100 of controlling an auxiliary pump (such as pump 32 of FIG. 1), as will be discussed in further detail below with respect to FIGS. 2A and 2B. The ECU 50 is configured or programmed, in part, to control operation of the transmission 12, engine 14, and auxiliary pump 32, and manage the distribution of power (i.e., current and voltage) to the various components of the powertrain system 10. For example, the ECU 50 is configured to control operation of the auxiliary pump 32 and the selective distribution of power, in the general nature of electric voltage or current, from a power source, such as battery 42, through operation of an auxiliary power module (APM) 40. The battery 42 may comprise any one of various devices operable to provide electrical energy storage capacity and distribution on the vehicle, such as a fuel cell, capacitor, fly wheel, and the like.

The powertrain system 10 also includes one or more sensing mechanisms, represented herein by sensors or transducers S1-S3, that are configured to continuously monitor, track, and/or detect various system parameters, such as vehicle speed, engine state, auxiliary pump state, transmission oil temperature, transmission input speed, throttle position, desired vs. actual auxiliary pump speed, next-intended auxiliary pump speed, a ramp trajectory, or any combination thereof. Each sensor is operably connected to the ECU 50 via a local area network (LAN) bus 38. The sensors S1-S3 are configured to transmit signals via LAN 38 to the controller 50 indicative or representative of the aforementioned parameters being monitored, tracked, or detected. Those skilled in the art will recognize and understand that the means of communication between the sensors S1-S3 and controller 50 is not restricted to the use of electric cables ("by wire"), but may, for example, be by radio frequency and other wireless technology, by electro-mechanical communication, fiber optics, and the like.

With reference now to the flow chart shown in FIGS. 2A and 2B, an algorithm for controlling operation of a transmission pump, namely an improved method of operating a transmission auxiliary pump by utilizing a novel pump voltage/current boost strategy, is shown generally as 100 in accordance with a preferred embodiment of the present invention. The method or algorithm 100 is described herein with respect to the structure illustrated in FIG. 1. However, the present invention may also be incorporated into other powertrain configurations, and applied to various other types of transmission auxiliary pumps. The method 100 preferably includes at least steps 101-137. However, it is within the scope and spirit of the present invention to omit steps, include additional steps, and/or modify the order presented in FIGS. 2A and 2B.

Looking to FIG. 2A, the method 100 begins at step 101 with determining an optimal auxiliary pump start voltage and/or current (which may be referred to collectively as an optimal auxiliary pump start characteristic). Determining the optimal auxiliary pump start voltage/current is achieved by fully characterizing the behavior of the auxiliary pump 32 throughout its full operating window, including the full speed-command range vs. pressure-commands at a full range of oil temperatures. For example, one manner of determining the optimal auxiliary pump start voltage/current is to map the "startability" performance of the auxiliary pump 32 (i.e., how quickly the pump 32 can be ramped up to operating speed) against the input voltage/current. Using the mapped relationship of startability vs. input voltage/current, an optimal starting voltage/current can be identified for that particular auxiliary pump configuration. The override value may include an optimal predetermined voltage and current combination for a given oil temperature, or other input signals from the hybrid system. The method 100 then determines if the present system voltage and/or current (which may be referred to collectively as a system power characteristic) is less then the optimal auxiliary pump start characteristic, as step 103. If the system voltage/current is not less than the optimal auxiliary pump start characteristic, the method 100 returns to step 101.

If the system voltage/current is less then the optimal auxiliary pump start voltage/current, the method 100 responds by determining if the auxiliary pump is in a start-mode, as step 105. Determining if the auxiliary pump is in start-mode (i.e., step 105) preferably consists of a three step process: first, determining if the actual auxiliary pump speed is greater than zero; second, determining if the ECU 50 is delivering a "prime auxiliary pump" signal (i.e., a command signal from the ECU 50 to prepare the auxiliary pump 32 for startup); and third, determining if the auxiliary pump 32 has exited the start mode. Notably, the order of these steps may be varied, and fewer or greater than three steps may be utilized to determine if the auxiliary pump is in start-mode as part of step 105. If the auxiliary pump 32 is in start-mode (e.g., "YES" to the above three-step process), the method 100 then determines if the actual auxiliary pump speed is less than a desired auxiliary pump speed. If not, the method 100 returns to step 101.

Prior to step 105, contemporaneously therewith, or thereafter, the method 100 establishes if a predetermined override condition has been met, at step 109. The predetermined override condition can be any established circumstance or set of circumstances under which power distribution to the auxiliary pump 32 should be boosted. If the actual auxiliary pump speed is less than the desired auxiliary pump speed (step 107) or the predetermined override condition has been met (step 109), the method 100 responds at step 111 by increasing the actual auxiliary pump voltage/current to equal the optimal auxiliary pump start characteristic—i.e., the optimal auxiliary pump start voltage or current. According to a preferred embodiment, increasing the actual auxiliary pump voltage/current consists of commanding the ECU 50 to override the system 10 and boost or increase the system voltage (which is typically 12 volts (V)) to equal an optimal auxiliary pump start voltage, which may be, but is not limited to, 14 V, 42 V, 300 V, single or 3 phase, etc. Specifically, the ECU 50 manipulates the system voltage such that the APM 40, which draws its power from the voltage of the system 10, is optimized for startability of the auxiliary pump 32.

According to a preferred embodiment, the method 100 of the present invention also optimizes the current injection waveform in our controller—i.e., the shape and timing of injecting the waveform. The current waveforms influence motor noise, temperature, efficiency etc. The methodology for which we optimize all of the voltages and currents is generally referred to as "road-to-lab-to-math" (RLM). By way of example, the shapes and timing of the current injection are pre-determined "on bench", and typically condensed into calibration tables that are programmed into the ECU 50. The predetermination part of the optimized parameters is accomplished systematically on a dynamometer, which automatically sweeps all possible voltages/currents while monitoring the optimization parameters (i.e., noise, heat, start time, etc.) and provides an optimal calibration for the ECU 50. In other words, the method 100 not only optimizes the magnitude of the current (i.e., increasing or decreasing), but also the shape and timing of the current injection.

The time during which the actual auxiliary pump voltage/current is increased to equal the optimal auxiliary pump start voltage/current (step 111), which may be referred to hereinafter as the "first time", is continuously monitored by the method 100 in step 113. As depicted in FIG. 2A, a timer is utilized in step 113 to determine when the first time is greater than a corresponding first precalibrated threshold time. If the first time exceeds the first precalibrated threshold time, the method 100 responds by setting the actual auxiliary pump voltage/current to equal a default power level. For example, the method 100 decreases the actual auxiliary pump voltage/current so that it does not equal the optimal auxiliary pump start voltage/current, or increases the actual auxiliary pump voltage/current to equal a precalculated system voltage for charging system battery, and ends or returns to start. If the monitored time (i.e., the first time) has not exceeded the first precalibrated threshold time, the method 100 then determines in step 115 if both the predetermined override condition is no longer met and the actual auxiliary pump speed is no longer less than the desired auxiliary pump speed. If so, the method 100 responds, similar to above, by setting the actual auxiliary pump voltage/current to equal a default power level—e.g., the system quickly ramps down to normal vehicle system voltage (typically in the range of 12V) for optimal fuel economy, which is generally acceptable for steady-state auxiliary pump operation.

According to another preferred embodiment of the present invention, the method 100 also includes determining if the auxiliary pump 32 is in an on-state (i.e., is currently in operation) if the auxiliary pump is not in start-mode (i.e., 105=NO), as step 117. If the auxiliary pump 32 is not in start mode (Step 105) and is not running (Step 117) the method 100 ends. However, according to step 119 of FIG. 2B, if the auxiliary pump is in an on-state, the method 100 responds by determining a hierarchy of optimization parameters. As part of this particular aspect of the invention, the method 100 also includes determining an optimal auxiliary pump steady-state/transient-state voltage and/or current (which may be referred to collectively as an optimal auxiliary pump transition characteristic), at step 121. As will be described below, determining an optimal auxiliary pump transition characteristic is based, at least in part, upon the hierarchy of optimization parameters established in step 119. Steps 119 and 121 are preferably performed in "real time" as long as the auxiliary pump 32 is running (e.g., when the engine 12 is in an off-state).

Figure 3:
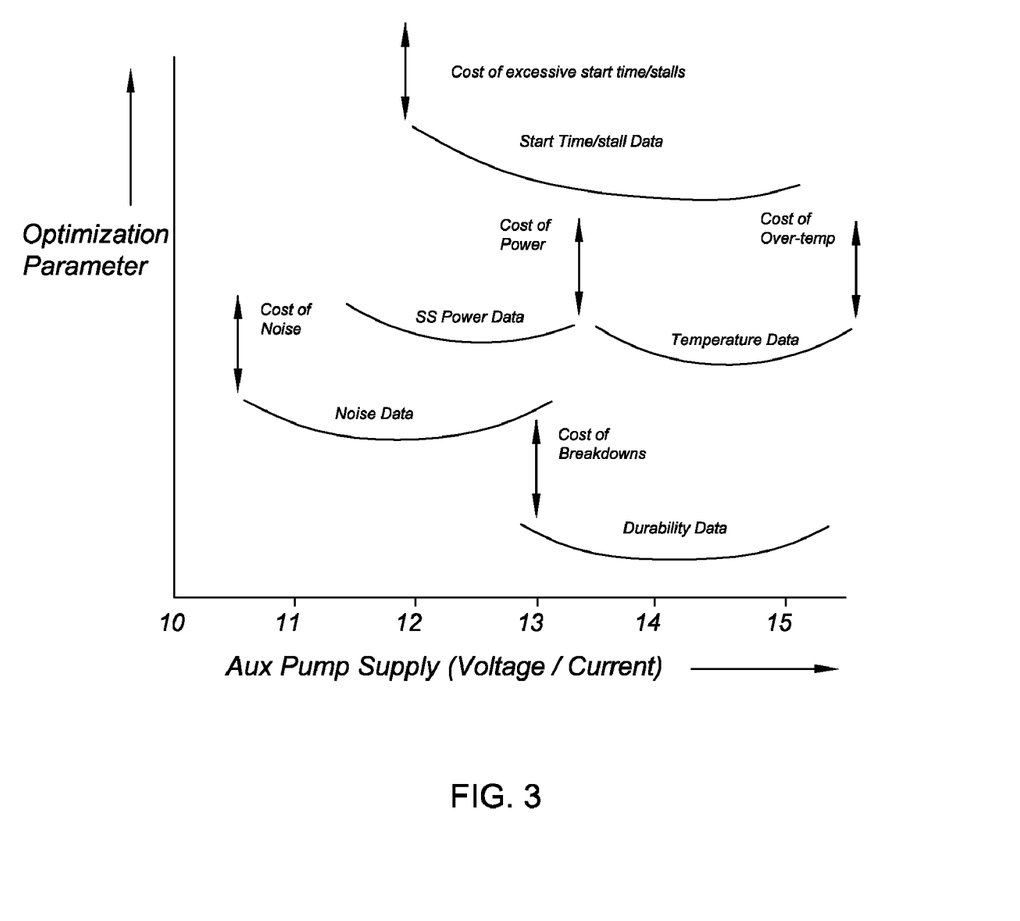
FIG. 3 is a cost-function chart illustrating auxiliary pump voltage as a control parameter in optimizing auxiliary pump system performance.

Steps 119 and 121 are incorporated into the method 100 of the present invention to identify and optimize the parameters that influence startability and operation of the auxiliary pump 32. FIG. 3 is a cost-function chart illustrating auxiliary pump voltage as a control parameter in optimizing auxiliary pump system performance. As seen in FIG. 3, the hierarchy of optimization parameters preferably includes, but is not limited to, a start time or anti-stall ("startability") parameter, a fuel economy parameter (represented as steady-state (SS) power data), a noise parameter, a temperature parameter, and a durability parameter. In general, the method 100 of the present invention assigns a value (or cost function) of operating the auxiliary pump 32 at a certain voltage given what is known for that particular voltage—e.g., how much noise is produced, how much power is consumed, the heat produced, durability performance, and fuel economy characteristics.

As described above, the startability parameter (or "start time/stall data as identified in FIG. 3) is a mapping of the performance of auxiliary pump 32 across different voltages/currents. Ideally, this characterization is performed for both auxiliary pump 32 startup (e.g., as part of step 101) and transient states (e.g., as part of step 121). In general, a "transient state" is when the auxiliary pump 32 is fully operational and must transition from one speed to another within a predetermined time. For example, if step 119 prioritizes the anti-stall parameter, step 121 would then look to FIG. 3 (i.e., as a "lookup table") across the "start time/stall data" function to identify the most favorable "anti-stall" voltage or current, which is then set as the optimal auxiliary pump transition characteristic.

If the vehicle speed is below a certain predetermined level (e.g., the vehicle is "creeping" at a very low throttle around a parking lot or stopped at a traffic light), and temperature and fuel economy are not a concern, it may be preferred to operate the auxiliary pump 32 at a voltage/current that minimizes noise for a given duty cycle (or pump speed). Accordingly, the noise parameter is prioritized in step 119, and an optimal voltage/current is deterministically identified based upon the noise function. For example, step 121 would include sweeping the input voltage and/or current across the "noise data" set in FIG. 3, and find the most favorable combination that minimizes noise, and set that value as the optimal auxiliary pump transition characteristic.

Desirably, if the temperature of the auxiliary pump 32 and/or the transmission oil 30 and/or the ambient air (not specifically identified in the drawings) is above a predetermined or undesirable threshold level, step 119 may revert to a range of operating voltages or currents that are predetermined to have a known cooling effect. For example, by referring to the temperature date function of FIG. 3, a current or voltage is identified that has been shown to minimize operating temperatures for a given pump speed.

Alternatively, if noise, temperature and durability are not of primary concern, the auxiliary pump 32 is run at a given current and/or voltage that is known (e.g., from prior testing) to provide optimal fuel economy. One manner of determining the optimal auxiliary pump transition characteristic based upon fuel economy (or "SS Power Data") is to record the power going into the powertrain system 10 and the power leaving the system 10 (e.g., the flow rate and pressure of transmission oil 30) against a sweep of APM 40 power. Once this function is properly plot, the method 100 would then identify in step 121 the minimal power consumption (as a product of input current and voltage) for a given mechanical output (product of oil flow rate and temperature), and choose the voltage that minimizes the input power for a given power output, and set that value as the optimal auxiliary pump transition characteristic.

If temperature, fuel economy, and noise are not an issue, the auxiliary pump 32 is run at a current/voltage that is known to offer the longest expected operational life of the pump motor (not shown). One manner of determining the optimal auxiliary pump transition characteristic based upon pump durability (or "Durability Data" in FIG. 3) is to run the auxiliary pump at different voltages and, from statistical analysis, select a voltage that is known to provide the best durability performance as step 121.

In general, deciding which optimization window to operate in includes monitoring, e.g., through sensors S1-S3, the vehicle speed, the temperature of transmission oil 31, the engine state, the auxiliary pump state, the transmission input speed, the position of throttle 44, a desired vs. actual auxiliary pump speed, a next-intended auxiliary pump speed, a ramp trajectory, or any combination thereof. Based upon these operating parameters, the method 100 determines which of the optimization windows—namely, startability, fuel economy, temperature, noise, or durability, to operate the auxiliary pump within. However, the present invention is not limited to the optimization strategy disclosed herein, and may be based upon any multivariate optimization strategy or optimization routine.

Once the optimal auxiliary pump steady-state/transient-state voltage and/or current is determined in step 121, the method 100 then determines in step 123 if the system power characteristic (i.e., system current/voltage) is not equal to the optimal auxiliary pump transition characteristic. If the system power characteristic is equal to the optimal auxiliary pump transition characteristic (123=NO), the method 100 returns to step 121. If yes, step 125 includes determining if the auxiliary pump is in a steady state. If the auxiliary pump is in steady state, the method 100 responds in step 127 by increasing the actual auxiliary pump voltage/current to equal the optimal auxiliary pump transition characteristic—i.e., the optimal auxiliary pump steady-state/transient-state voltage/current. In this particular embodiment, the ECU 50 preferably influences or controls the power distribution to the auxiliary pump 32 independent of the system voltage/current. However, increasing the actual auxiliary pump voltage/current in step 127 may consist of commanding the ECU 50 to override the system 10 and boost or increase the system voltage/current to equal the optimal auxiliary pump transition characteristic.

If the auxiliary pump 32 is not in steady state (i.e., step 125=NO), the method 100 determines in step 129 if the auxiliary pump is in a transient state. If not, the method returns to step 121. If yes, the method 100 responds by determining an optimal auxiliary pump transition characteristic ramp rate based upon a predetermined magnitude of the transient state, in step 131. For example, the control system (i.e., ECU 50, sensors S1-S3, APM 40, etc.) needs to be able to command the auxiliary pump 32 to execute a speed vs. time profile (e.g., a simple ramp rate or a curve), and make sure it is being followed. The speed vs. time profile will include a start-up profile (i.e., one for starting the auxiliary pump 32), and a transitional profile, used for going from one pump speed to another. Accordingly, the control system not only picks an optimal auxiliary pump state, but also finds the optimal path (profile) to achieve that state. To this regard, the method 100 also includes step 133, which requires the system 10 to increase the actual auxiliary pump voltage/current to equal the optimal auxiliary pump transition characteristic according to the optimal auxiliary pump transition characteristic ramp rate. Similar to above, control of the power distribution to the auxiliary pump 32 is preferably independent of the system voltage/current. The current and voltage is varied to obtain a desired speed; however, the ultimate goal is a desired pressure and flow of the transmission fluid. As such, the method 100 can use a flow/pressure model in context with the optimization strategy.

The time during which the actual auxiliary pump voltage/current is increased to equal the optimal auxiliary pump transition characteristic (steps 127 and 133), which may be referred to hereinafter as the "second time", is continuously monitored by the method 100 in step 135. As depicted in FIG. 2B, a timer is utilized in step 135 to determine when the second time is greater than a corresponding second precalibrated threshold time. If the second time exceeds the second precalibrated threshold time, the method 100 responds by setting the actual auxiliary pump voltage/current to equal a default power level (similar to that described above with respect to Steps 113 and 115). If the monitored time—i.e., the second time, has not exceeded the second precalibrated threshold time, the method 100 then determines in step 137 if the auxiliary pump 32 is no longer in an on-state (e.g., the engine 14 is running and transmitting power to the final drive system 16 of FIG. 1). If so, the method 100 responds, similar to above, by setting the actual auxiliary pump voltage/current to equal a default power level—e.g., the system quickly ramps down to normal vehicle system voltage (typically in the range of 12V) for optimal fuel economy, as seen in FIG. 2B.

While the best modes for carrying out the invention have been described in detail, those familiar with the art to which this invention pertains will recognize various alternative designs and embodiments for practicing the invention within the scope of the appended claims.

The invention claimed is:

1. A method of controlling an auxiliary pump by a processor for use with a power transmission in a vehicle including an electronic control unit and a throttle, the vehicle having a system power characteristic defined by at least one of a system voltage and a system current, the method comprising:
  determining an optimal auxiliary pump start characteristic defined by at least one of an optimal pump start voltage and an optimal pump start current;
  determining if the system power characteristic is less than said optimal auxiliary pump start characteristic;
  determining if the auxiliary pump is in a start-mode if the system power characteristic is less than said optimal auxiliary pump start characteristic;
  determining if an actual auxiliary pump speed is less than a desired auxiliary pump speed if the auxiliary pump is in said start-mode; and
  increasing at least one of an actual auxiliary pump voltage and current to equal said optimal auxiliary pump start characteristic if said actual auxiliary pump speed is less than said desired auxiliary pump speed.

2. The method of claim 1, further comprising:
  determining if a predetermined override condition has been met if the system power characteristic is less than said optimal auxiliary pump start characteristic; and
  increasing said at least one of an actual auxiliary pump voltage and current to equal said optimal auxiliary pump start characteristic if said predetermined override condition has been met.

3. The method of claim 2, further comprising:
  monitoring a first time during which said at least one of an actual auxiliary pump voltage and current is increased to equal said optimal auxiliary pump start characteristic;
  determining if said first time is greater than a first precalibrated threshold time; and setting said at least one of an actual auxiliary pump voltage and current to equal a default power level if said first time is greater than said first precalibrated threshold time.

4. The method of claim 3, further comprising:
determining if said actual auxiliary pump speed is not less than said desired auxiliary pump speed and if said predetermined override condition is not met if said first time is not greater than said first precalibrated threshold time; and
setting said at least one of an actual auxiliary pump voltage and current to equal a default power level if said actual auxiliary pump speed is not less than said desired auxiliary pump speed and said predetermined override condition is not met.

5. The method of claim 4, wherein said increasing said at least one of an actual auxiliary pump voltage and current includes commanding the electronic control unit to increase at least one of the system voltage and current to equal said optimal auxiliary pump start characteristic.

6. The method of claim 5, wherein said determining if the auxiliary pump is in a start-mode includes at least one of:
determining if said actual auxiliary pump speed is greater than zero;
determining if the electronic control unit is delivering a prime auxiliary pump signal; and
determining if the auxiliary pump has exited said start mode.

7. The method of claim 2, further comprising:
determining if the auxiliary pump is in an on-state if the auxiliary pump is not in said start-mode.

8. The method of claim 7, further comprising:
determining a hierarchy of optimization parameters if the auxiliary pump is in said on-state;
determining an optimal auxiliary pump transition characteristic based at least in part upon said hierarchy of optimization parameters, said optimal auxiliary pump transition characteristic defined by at least one of an optimal steady-transient state voltage and an optimal steady-transient state current;
determining if the system power characteristic is not equal to said optimal auxiliary pump transition characteristic;
determining if the auxiliary pump is in a steady state if the system power characteristic is not equal to said optimal auxiliary pump transition characteristic; and
increasing at least one of said actual auxiliary pump voltage and current to equal said optimal auxiliary pump transition characteristic if the auxiliary pump is in said steady state.

9. The method of claim 8, further comprising:
determining if the auxiliary pump is in a transient state if the auxiliary pump is not in said steady state;
determining an optimal auxiliary pump transition characteristic ramp rate based at least in part upon a predetermined magnitude of said transient state; and
increasing said at least one of said actual auxiliary pump voltage and current to equal said optimal auxiliary pump transition characteristic according to said optimal auxiliary pump transition characteristic ramp rate if the auxiliary pump is in said transient state.

10. The method of claim 9, further comprising:
monitoring a second time during which said at least one of said actual auxiliary pump voltage and current is increased to equal said optimal auxiliary pump transition characteristic;
determining if said second time is greater than a second precalibrated threshold time; and
setting said at least one of an actual auxiliary pump voltage and current to equal a default power level if said second time is greater than said second precalibrated threshold time.

11. The method of claim 10, further comprising:
determining if the auxiliary pump is not in said on-state if said second time is not greater than said second precalibrated threshold time; and
setting said at least one of an actual auxiliary pump voltage and current to equal a default power level if the auxiliary pump is not in said on-state.

12. The method of claim 9, wherein said increasing said at least one of said actual auxiliary pump voltage and current includes commanding the electronic control unit to increase at least one of the system voltage and current to equal said optimal auxiliary pump transition characteristic.

13. The method of claim 9, wherein said hierarchy of optimization parameters includes a startability parameter, a fuel economy parameter, a noise parameter, a temperature parameter, and a durability parameter.

14. The method of claim 13, wherein said determining a hierarchy of optimization parameters includes at least one of monitoring a vehicle speed, a transmission oil temperature, a transmission input speed, a throttle position, a desired vs. actual auxiliary pump speed, a next-intended auxiliary pump speed, and a ramp trajectory.

15. A method of controlling an auxiliary pump by a processor for use with a power transmission in a hybrid vehicle including an electronic control unit, the hybrid vehicle having a system power characteristic defined by at least one of a system voltage and a system current, the method comprising:
determining an optimal auxiliary pump start characteristic defined by at least one of an optimal pump start voltage and an optimal pump start current;
determining if the system power characteristic is less than said optimal auxiliary pump start characteristic;
determining if the auxiliary pump is in a start-mode and if a predetermined override condition has been met if the system power characteristic is less than said optimal auxiliary pump start characteristic;
determining if an actual auxiliary pump speed is less than a desired auxiliary pump speed if the auxiliary pump is in said start-mode; and
increasing at least one of an actual auxiliary pump voltage and current to equal said optimal auxiliary pump start characteristic if said actual auxiliary pump speed is less than said desired auxiliary pump speed or if said predetermined override condition has been met;
wherein said increasing said respective at least one actual auxiliary pump voltage and current includes commanding the electronic control unit to increase at least one of the system voltage and current to equal said optimal auxiliary pump start characteristic.

16. The method of claim 15, further comprising:
monitoring a first time during which said at least one actual auxiliary pump voltage and current is increased to equal said optimal auxiliary pump start characteristic;
determining if said first time is greater than a first precalibrated threshold time;
determining if said actual auxiliary pump speed is not less than said desired auxiliary pump speed and if said predetermined override condition is not met if said first time is not greater than said first precalibrated threshold time; and
setting said at least one actual auxiliary pump voltage and current to equal a default power level if said first time is greater than said first precalibrated threshold time or said actual auxiliary pump speed is not less than said desired auxiliary pump speed and said predetermined override condition is not met.

17. The method of claim 16, further comprising:
determining if the auxiliary pump is in an on-state if the auxiliary pump is not in said start-mode;
determining a hierarchy of optimization parameters if the auxiliary pump is in said on-state;
determining an optimal auxiliary pump transition characteristic based at least in part upon said hierarchy of optimization parameters, said optimal auxiliary pump transition characteristic defined by at least one of an optimal steady-transient state voltage and an optimal steady-transient state current;
determining if the system power characteristic is not equal to said optimal auxiliary pump transition characteristic;
determining if the auxiliary pump is in a steady state if the system power characteristic is not equal to said optimal auxiliary pump transition characteristic;
increasing at least one of said actual auxiliary pump voltage and current to equal said optimal auxiliary pump transition characteristic if the auxiliary pump is in said steady state;
determining if the auxiliary pump is in a transient state if the auxiliary pump is not in said steady state;
determining an optimal auxiliary pump transition characteristic ramp rate based at least in part upon a predetermined magnitude of said transient state; and
increasing at least one of said actual auxiliary pump voltage and current to equal said optimal auxiliary pump transition characteristic according to said optimal auxiliary pump transition characteristic ramp rate if the auxiliary pump is in said transient state.

18. The method of claim 17, further comprising:
monitoring a second time during which said at least one actual auxiliary pump voltage and current is increased to equal said optimal auxiliary pump transition characteristic;
determining if second first time is greater than a second precalibrated threshold time;
determining if the auxiliary pump is not in said on-state if said second time is not greater than said second precalibrated threshold time; and
setting said at least one actual auxiliary pump voltage and current to equal a default power level if said second time is greater than said second precalibrated threshold time or the auxiliary pump is not in an on-state.

19. The method of claim 18, wherein said hierarchy of optimization parameters includes a startability parameter, a fuel economy parameter, a noise parameter, a temperature parameter, and a durability parameter; and
wherein said determining a hierarchy of optimization parameters includes monitoring a vehicle speed, a transmission oil temperature, a transmission input speed, a throttle position, a current desired vs. actual auxiliary pump speed, a next-intended auxiliary pump speed, and a ramp trajectory.

20. A method of controlling an auxiliary pump by a processor for use with a power transmission in a hybrid vehicle including an electronic control unit, the hybrid vehicle having a system power characteristic defined by at least one of a system voltage and a system current, the method comprising:
determining an optimal auxiliary pump start characteristic defined by at least one of an optimal pump start voltage and an optimal pump start current;
determining if the system power characteristic is less than said optimal auxiliary pump start characteristic;
determining if the auxiliary pump is in a start-mode and if a predetermined override condition has been met if the system power characteristic is less than said optimal auxiliary pump start characteristic;
determining if an actual auxiliary pump speed is less than a desired auxiliary pump speed if the auxiliary pump is in said start-mode;
increasing at least one of an actual auxiliary pump voltage and current to equal said optimal auxiliary pump start characteristic if said actual auxiliary pump speed is less than said desired auxiliary pump speed or if said predetermined override condition has been met;
determining if the auxiliary pump is in an on-state if the auxiliary pump is not in said start-mode;
determining a hierarchy of optimization parameters if the auxiliary pump is in said on-state;
determining an optimal auxiliary pump transition characteristic based at least in part upon said hierarchy of optimization parameters, said optimal auxiliary pump transition characteristic defined by at least one of an optimal steady-transient state voltage and an optimal steady-transient state current;
determining if the system power characteristic is not equal to said optimal auxiliary pump transition characteristic;
determining if the auxiliary pump is in a steady state if the system power characteristic is not equal to said optimal auxiliary pump transition characteristic;
increasing at least one of said actual auxiliary pump voltage and current to equal said optimal auxiliary pump transition characteristic if the auxiliary pump is in said steady state;
determining if the auxiliary pump is in a transient state if the auxiliary pump is not in said steady state;
determining an optimal auxiliary pump transition characteristic ramp rate based at least in part upon a predetermined magnitude of said transient state; and
increasing at least one of said actual auxiliary pump voltage and current to equal said optimal auxiliary pump transition characteristic according to said optimal auxiliary pump transition characteristic ramp rate if the auxiliary pump is in said transient state.

* * * * *